US010550788B2

(12) United States Patent
Myojo et al.

(10) Patent No.: US 10,550,788 B2
(45) Date of Patent: Feb. 4, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Keiichi Myojo, Okazaki (JP); Yuki Nose, Kasugai (JP); Eiji Ikuta, Oobu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 27 days.

(21) Appl. No.: 16/027,996

(22) Filed: Jul. 5, 2018

(65) Prior Publication Data

US 2019/0024603 A1 Jan. 24, 2019

(30) Foreign Application Priority Data

Jul. 21, 2017 (JP) .................. 2017-141732

(51) Int. Cl.
*F02D 41/14* (2006.01)
*F02D 41/24* (2006.01)
(Continued)

(52) U.S. Cl.
CPC ....... *F02D 41/2458* (2013.01); *F01N 3/0871* (2013.01); *F01N 3/101* (2013.01); *F01N 3/2006* (2013.01); *F01N 3/2033* (2013.01); *F01N 3/2066* (2013.01); *F02D 41/0002* (2013.01); *F02D 41/008* (2013.01); *F02D 41/0032* (2013.01); *F02D 41/025* (2013.01); *F02D 41/08* (2013.01); *F02P 5/1502* (2013.01); *F01N 2430/06* (2013.01); *F02D 41/1408* (2013.01); *F02D 41/1454* (2013.01);
(Continued)

(58) Field of Classification Search
CPC ............... F02D 41/2458; F02D 41/008; F02D 41/0032; F02D 41/0025; F02D 41/08; F02D 41/0002; F02D 41/1408; F02D 41/22; F02D 41/1454; F02D 43/00; F02D 45/00; F01N 3/2033; F01N 3/2006; F01N 3/101; F01N 3/0871; F01N 3/2066; F01N 2430/06; F02P 5/1502
USPC ................................................. 123/520, 443
See application file for complete search history.

(56) References Cited

U.S. PATENT DOCUMENTS

2019/0048815 A1* 2/2019 Myojo ...................... F01N 9/00
2019/0101073 A1* 4/2019 Ban ...................... F02D 41/0042

FOREIGN PATENT DOCUMENTS

JP 2004-218541 8/2004

* cited by examiner

*Primary Examiner* — Hai H Huynh
(74) *Attorney, Agent, or Firm* — Finnegan, Henderson, Farabow, Garrett & Dunner, LLP (57) ABSTRACT

A controller for an internal combustion engine is configured to execute a dither control process, a purge control process, and a limiting process. The dither control process operates the fuel injection valves such that at least one of the cylinders is a lean combustion cylinder, in which the air-fuel ratio is leaner than the stoichiometric air-fuel ratio, and at least another one of the cylinders is a rich combustion cylinder, in which the air-fuel ratio is richer than the stoichiometric air-fuel ratio. The purge control process controls the purge flow rate by operating the adjustment device. The limiting process limits the purge control process such that, when the dither control process is being executed, the purge flow rate is reduced as compared to a case in which the dither control process is not being executed.

8 Claims, 8 Drawing Sheets

(51) Int. Cl.
  *F01N 3/20*    (2006.01)
  *F01N 3/08*    (2006.01)
  *F02D 41/08*   (2006.01)
  *F02P 5/15*    (2006.01)
  *F02D 41/00*   (2006.01)
  *F01N 3/10*    (2006.01)
  *F02D 41/02*   (2006.01)
  *F02D 45/00*       (2006.01)
  *F02D 41/22*       (2006.01)
  *F02D 43/00*       (2006.01)

(52) U.S. Cl.
  CPC .............. *F02D 41/22* (2013.01); *F02D 43/00* (2013.01); *F02D 45/00* (2013.01)

CONTROLLER AND CONTROL METHOD FOR INTERNAL COMBUSTION ENGINE

CROSS REFERENCE TO RELATED APPLICATION

This application claims priority from Japanese Patent Application No. 2017-141732, filed on Jun. 12, 2017, the disclosure of which is incorporated herein by reference in its entirety.

BACKGROUND

The present disclosure relates to a controller and a control method for an internal combustion engine that are configured to control an internal combustion engine that includes a catalyst, which purifies exhaust gas discharged from cylinders, fuel injection valves provided for the respective cylinders, a canister, which collects fuel vapor in the fuel tank, which stores fuel to be injected by the fuel injection valves, and an adjustment device, which adjusts the amount of fuel vapor trapped in the canister flowing into the intake passage.

For example, Japanese Laid-Open Patent Publication No. 2004-218541 discloses a controller that executes dither control. In the dither control, when there is a requirement for increase in the temperature of a catalyst device (catalyst), the air-fuel ratio is made richer than the stoichiometric air-fuel ratio in some cylinders, while the air-fuel ratio is made leaner than the stoichiometric air-fuel ratio in the other cylinders, such that the air-fuel ratio of the exhaust gas flowing into the catalyst becomes a target air-fuel ratio.

Also, a type of controller for an internal combustion engine is known that executes purge control to return fuel vapor in the fuel tank, which stores fuel to be injected from the fuel injection valves, to the intake passage.

In the case of executing the dither control, the air-fuel ratio in the rich combustion cylinder and the air-fuel ratio in the lean combustion cylinder are differentiated from each other. Thus, as compared with a case in which the air-fuel ratios of all the cylinders are controlled to be the same, the air-fuel ratio is restricted from being set to a value resistant to deterioration of combustion. This is likely to degrade the combustion. On the other hand, when the purge control is executed, the fuel vapor is not necessarily distributed evenly to the cylinders. This can cause the air-fuel ratio in each cylinder to deviate from the target air-fuel ratio. Therefore, when the dither control is executed during execution of the purge control, the tendency of deterioration of the combustion due to the execution of the dither control may be promoted and made noticeable by the distribution unevenness of fuel vapor among the cylinders due to the purge control.

SUMMARY

Example 1

One aspect of the present disclosure provides a controller for an internal combustion engine configured to control an internal combustion engine. The engine includes a catalyst, which purifies exhaust gas discharged from a plurality of cylinders, fuel injection valves provided for the respective cylinders, a canister, which collects fuel vapor in a fuel tank, which stores fuel to be injected by the fuel injection valves, and an adjustment device, which adjusts a purge flow rate from the canister to an intake passage. The controller for an internal combustion engine being configured to execute a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio, a purge control process of controlling the purge flow rate by operating the adjustment device, and a limiting process of limiting the purge control process such that, when the dither control process is being executed, the purge flow rate is reduced as compared to a case in which the dither control process is not being executed.

With the above-described configuration, when the dither control process is being executed, the controller limits, through the limiting process, the purge control process such that the purge flow rate decreases. As a result, as compared with a case in which the limiting process is not executed, it is possible to reduce the degree to which the air-fuel ratio in each of the cylinders deviates from the target air-fuel ratio due to the uneven distribution of the fuel vapor to the cylinders. Accordingly, it is possible to prevent or restrain the tendency of deterioration of the combustion due to the execution of the dither control from being promoted or made noticeable by the distribution unevenness of fuel vapor among the cylinders due to the purge control.

Example 2

In the controller of Example 1, the purge control process includes a target purge parameter setting process of setting a target purge parameter, which is a target value of a purge parameter correlated with the purge flow rate, the purge control process being a process of controlling the purge flow rate by controlling the purge parameter to be the target purge parameter. The limiting process includes a guard process of guarding the target purge parameter with a guard value that limits the purge flow rate such that, when the dither control process is being executed, the purge flow rate is reduced as compared to a case in which the dither control process is not being executed, wherein the limiting process is a process of causing the adjustment device to be operated in the purge control process based on the target purge parameter that is subjected to the guard process.

With the above-described configuration, by controlling the purge parameter to the target purge parameter, which has been subjected to the guard process, it is possible to limit the purge flow rate to become less than when the dither control process is not being executed.

Example 3

In the controller of Example 2, the guard value is a fixed value.

In the above-described configuration, setting the guard value to a fixed value reduces the number of steps to adjust the guard value as compared with a case in which the guard value is set variably.

Example 4

In the controller of any one of Examples 1 to 3, the limiting process includes a purge prohibition process of prohibiting the purge control process.

With the above-described configuration, since the purge prohibition process is executed, it is possible to prevent or restrain the tendency of deterioration of the combustion due to the execution of the dither control from being promoted or made noticeable by the distribution unevenness of fuel vapor among the cylinders due to the purge control.

Example 5

In the controller of Example 2, the guard process includes a guard value varying process of variably setting the guard value based on an operating point of the internal combustion engine.

During the execution of the dither control execution, the combustion tends to deteriorate as compared with a case in which the dither control is not executed. The easiness of promotion of the tendency by the distribution unevenness of fuel vapor among the cylinders due to the purge control can differ depending on the operating point of the internal combustion engine. Therefore, in the above-described configuration, by variably setting the guard value, it is possible to set a guard value that can increase the purge flow rate as much as possible as compared with the case of using a fixed value.

Example 6

In the controller of any one of Examples 1 to 5, the controller executes a stopping process of stopping the limiting process of a predetermined period on condition that time during which limitation by the dither control process is performed is longer than or equal to a threshold value, and a stopping-time limiting process of limiting the dither control process such that, when the stopping process is executed, a difference in an air-fuel ratio between the cylinders is reduced.

If the purge flow rate is limited on condition that the dither control process is executed, the concentration of fuel vapor in the canister may become excessively high. Accordingly, in the above-described configuration, the limiting process is stopped on condition that the time during which the limitation by the dither control process is performed is longer than or equal to the threshold value. This reduces the concentration of the fuel vapor in the canister. Further, by limiting the dither control process at this time, it is possible to prevent or restrain the tendency of deterioration of the combustion due to the execution of the dither control from being promoted or made noticeable by the distribution unevenness of fuel vapor among the cylinders due to the purge control.

Example 7

The controller of Example 6, the stopping-time limiting process is a dither prohibition control for prohibiting the dither control.

With the above-described configuration, since the dither control is prohibited when the limiting process is stopped, it is possible to prevent or restrain the tendency of deterioration of the combustion due to the execution of the dither control from being promoted or made noticeable by the distribution unevenness of fuel vapor among the cylinders due to the purge control.

Example 8

Another aspect of the present disclosure provides a method of controlling an internal combustion engine. The engine includes a catalyst, which purifies exhaust gas discharged from a plurality of cylinders, fuel injection valves provided for the respective cylinders, a canister, which collects fuel vapor in a fuel tank, which stores fuel to be injected by the fuel injection valves, and an adjustment device, which adjusts a purge flow rate from the canister to an intake passage. The method of controlling an internal combustion engine includes: operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio; controlling the purge flow rate by operating the adjustment device; and limiting the purge control process such that, when the dither control process is being executed, the purge flow rate is reduced as compared to a case in which the dither control process is not being executed.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

First Embodiment

A controller and control method for an internal combustion engine according to a first embodiment will now be described with reference to the drawings.

Figure 1:
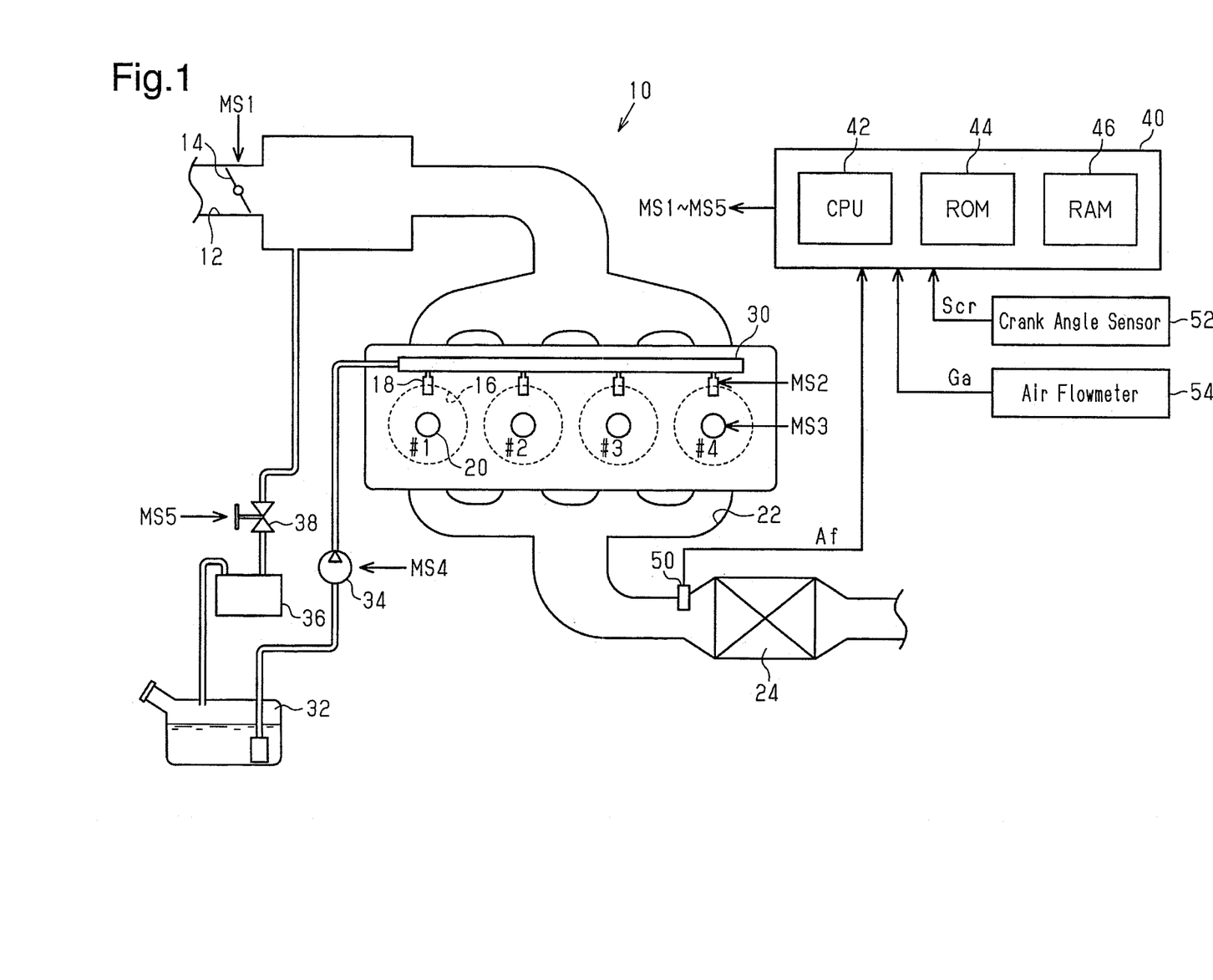
FIG. 1 is a diagram showing a controller according to a first embodiment and an internal combustion engine.

In an internal combustion engine 10 shown in FIG. 1, the air drawn in from an intake passage 12 flows into combustion chambers 16 of the respective cylinders via a throttle valve 14. A fuel injection valve 18 configured to inject fuel protrudes in each combustion chamber 16. Also, an ignition device 20 configured to generate spark discharge projects into the combustion chamber 16. In the combustion chamber 16, the air-fuel mixture is used for combustion, and the air-fuel mixture used for combustion is exhausted to an exhaust passage 22 as exhaust gas. A three-way catalyst 24 having an oxygen storage capacity is provided in the exhaust passage 22.

The fuel injection valve 18 injects the fuel in a delivery pipe 30. The delivery pipe 30 receives the fuel stored in a fuel tank 32, which is pumped up by a fuel pump 34. Some of the fuel stored in the fuel tank 32 vaporizes to become fuel vapor. This fuel vapor is collected by a canister 36. The fuel vapor collected by the canister 36 flows into the intake passage 12 via a purge valve 38, of which the opening degree can be electronically controlled.

The controller 40 is configured to control the internal combustion engine 10. The controller 40 controls the controlled portions of the engine 10 such as the throttle valve 14, the fuel injection valves 18, the ignition devices 20, the fuel pump 34, the purge valve 38, thereby controlling the controlled amounts such as the torque, the exhaust component, and the like of the engine 10. At this time, the controller 40 refers to an air-fuel ratio Af detected by an air-fuel ratio sensor 50 on the upstream side of the three-way catalyst 24, an output signal Scr of a crank angle sensor 52, an intake amount Ga detected by an air flowmeter 54. The controller 40 includes a CPU 42, a ROM 44, and a RAM 46 and is configured to execute control of the above-described controlled amounts by executing programs stored in the ROM 44 using the CPU 42.

Figure 2:
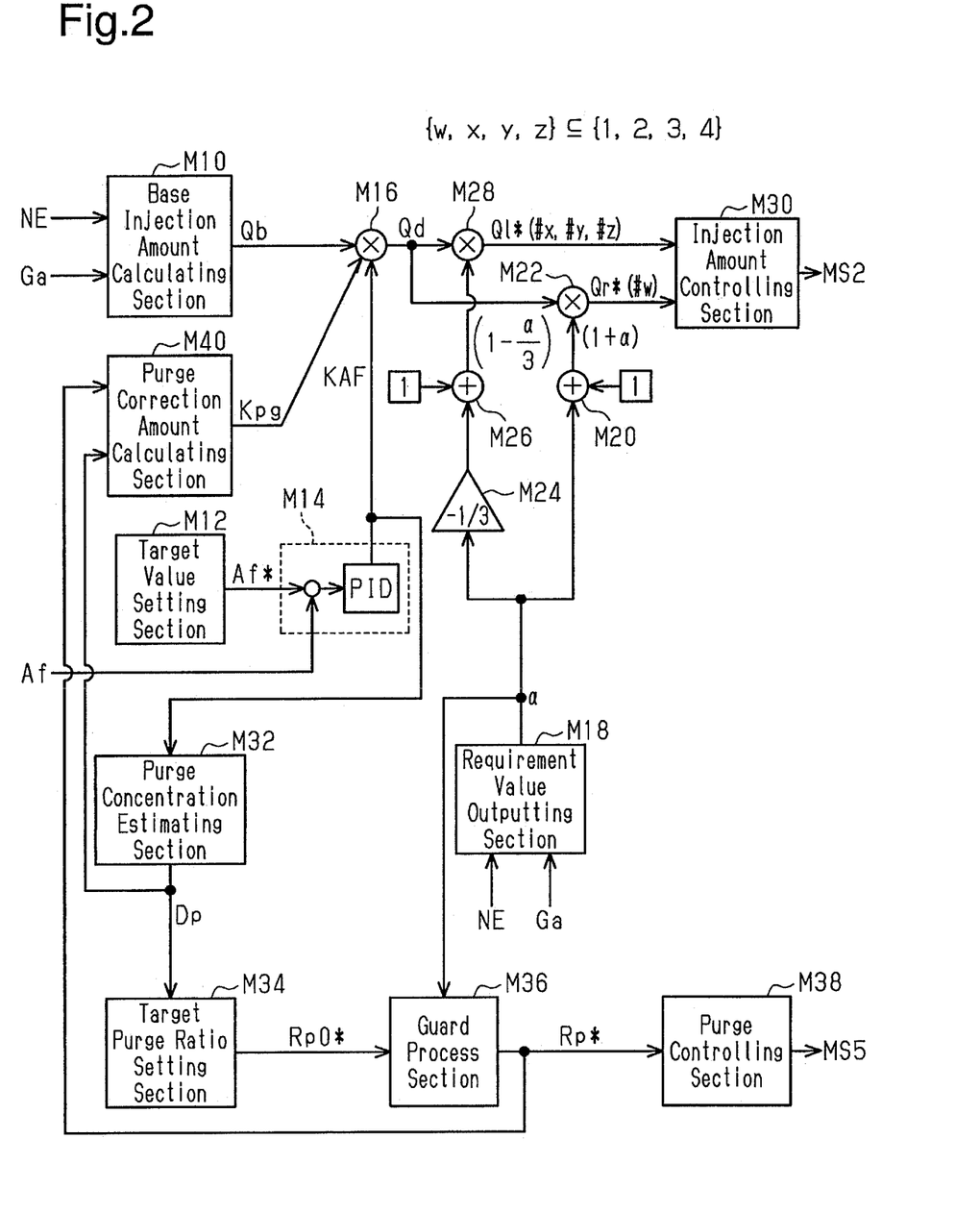
FIG. 2 is a block diagram showing a part of the process executed by the controller according to the first embodiment.

FIG. 2 shows part of the process that is implemented by the CPU 42 executing programs stored in the ROM 44.

Based on the intake amount Ga and the engine speed NE, which is calculated based on the output signal Scr of the crank angle sensor 52, a base injection amount calculating section M10 calculates a base injection amount Qb, which is an operation amount for executing open-loop control to cause the air-fuel ratio of the air-fuel mixture in the combustion chamber 16 to become a target air-fuel ratio. In the present embodiment, the target air-fuel ratio is set to the stoichiometric air-fuel ratio.

A target value setting section M12 sets a target value Af* of the feedback control amount that is used to control the air-fuel ratio of the air-fuel mixture in the combustion chamber 16 to become the target air-fuel ratio. A feedback section M14 calculates a feedback operation amount KAF, which is an operation amount used to execute feedback control to cause the air-fuel ratio Af, which is a feedback control amount, to become the target value Af*. In the present embodiment, the feedback operation amount KAF is the sum of the output values of a proportional element that has, as the input, the difference between the target value Af* and the air-fuel ratio Af, an integral element, and a differential element.

A required injection amount calculating section M16 calculates a required injection amount Qd by correcting the base injection amount Qb based on the process of multiplying the base injection amount Qb by the feedback operation amount KAF.

On the condition that a requirement to increase the temperature of the three-way catalyst 24 arises, a requirement value outputting section M18 calculates a correction requirement value α, while setting, to the target air-fuel ratio, the mean value of the air-fuel ratios (exhaust air-fuel ratio) in the cylinders #1 to #4 of the internal combustion engine 10. The correction requirement value α is used in dither control configured to differentiate the air-fuel ratio of the air-fuel mixture to be burned among the cylinders. In the dither control according to the present embodiment, one of the first to fourth cylinders #1 to #4 is a rich combustion cylinder, in which the air-fuel ratio is made richer than the stoichiometric air-fuel ratio, and the remaining three cylinders are lean combustion cylinders, in which the air-fuel ratio is leaner than the stoichiometric air-fuel ratio. The injection amount in the rich combustion cylinder is calculated by multiplying the required injection amount Qd by a value $(1+\alpha)$. The injection amount in the lean combustion cylinder is calculated by multiplying the required injection amount Qd by a value $(1-(\alpha/3))$.

The exhaust air-fuel ratio of the target exhaust gas is defined by using a hypothetical air-fuel mixture. The hypothetical air-fuel mixture is defined as a mixture of only fresh air and fuel that is composed such that, when burned, the resultant exhaust gas has an unburned fuel concentration (for example, HC), an incomplete combustion component concentration (for example, CO), and an oxygen concentration that are the same as those of the target exhaust gas. The exhaust air-fuel ratio is defined as the air-fuel ratio of the hypothetical air-fuel mixture. The combustion of the hypothetical air-fuel mixture is not limited to combustion in which at least one of the oxygen concentration and the concentration of the unburned fuel and the incomplete combustion component is zero or can be regarded as zero, but also includes combustion in which the oxygen concentration and the concentration of the unburned fuel and the incomplete combustion component are both greater than zero. The mean value of the exhaust air-fuel ratios of the cylinders is defined as the exhaust air-fuel ratio in a case in which the exhaust gas discharged from the cylinders is the target exhaust gas. According to the setting of the injection amount of the lean combustion cylinder and the rich combustion cylinder, the target fuel-air ratio is set to the mean value of the fuel-air ratios of the air-fuel mixture to be burned in the respective cylinders, so that the target air-fuel ratio can be set to the mean value of the exhaust air-fuel ratio. The fuel-air ratio is the reciprocal of the air-fuel ratio.

Specifically, the requirement value outputting section M18 variably sets the correction requirement value α based on the engine speed NE and a charging efficiency η. The charging efficiency η is a parameter indicating the load and is calculated by the CPU 42 based on the engine speed NE and the intake air amount Ga. The correction requirement value α is set to the maximum in the medium load region. This setting is employed in consideration of the fact that, since the combustion is unstable in the low load region as compared with the medium load region, it is more difficult to increase the correction requirement value α in the low load region than in the medium load region, and that the exhaust temperature is high without executing the dither control in the high load region. Also, the correction requirement value α is set to a greater value when the engine speed NE is high than when the engine speed NE is low. This is because the combustion is more stable when the engine speed NE is high than when the engine speed NE is low, so that the correction requirement value α can be easily set to a great value. Specifically, the ROM 44 stores map data that defines the relationship between input variables, which are the engine speed NE and the charging efficiency η, and an output variable, which is the correction requirement value α. The CPU 42 calculates the correction requirement value α using the map data. A map refers to a data set of discrete values of input variables and values of output variables each corresponding to a value of the input variables. When the value of an input variable matches one of the values of input variable on the map data, the map calculation uses the value of the corresponding output variable as the calculation result. When the value of the input variable does not match any of the values of the input variable of the map data, the map calculation uses a value obtained by interpolation of multiple values of the output variable included in the data set as the calculation result.

In the present embodiment, in order to limit the rate of change of the correction requirement value α, the requirement value outputting section M18 executes a guard process such that the difference between the correction requirement value α, which was calculated through the map calculation, and the previous value is less than or equal to a predetermined value. The requirement value outputting section M18 outputs the correction requirement value α that has been subjected to the guard process.

In the present embodiment, a temperature increase requirement arises in the case in which the warm-up requirement of the three-way catalyst 24 arises and the case in which the execution condition of the sulfur release process of the three-way catalyst 24 is satisfied. The warm-up requirement of the three-way catalyst 24 is made when the temperature of the coolant of the internal combustion engine 10 is lower than or equal to a predetermined temperature and the integrated air amount from the engine start is less than or equal to a predetermined value (predetermined value >specified value) after it is determined that the distal end temperature of the catalyst has become the activation temperature due to the fact that the integrated air amount becomes greater than or equal to the specified value. On the other hand, the execution condition of the sulfur release process may be changed as long as it is satisfied when the sulfur poisoning amount of the three-way catalyst 24 becomes greater than or equal to a predetermined value. The sulfur poisoning amount can be calculated such that, for example, the increase amount of the poisoning amount increases as the engine speed NE increases and the charging efficiency η increases, and the sulfur poisoning amount can be calculated by integrating the increase amount.

A correction coefficient calculating section M20 adds the correction requirement value α to 1 to calculate the correction coefficient for the required injection amount Qd regarding the rich combustion cylinder. A dither correcting section M22 multiplies the required injection amount Qd by the correction coefficient (1+α) to calculate the injection amount command value Qr* for the rich combustion cylinder.

A multiplication section M24 multiplies the correction requirement value α by −⅓. Regarding the lean combustion cylinder, a correction coefficient calculating section M26 adds the output value of the multiplication section M24 to 1 to calculate the correction coefficient for the required injection amount Qd. A dither correcting section M28 multiplies the required injection amount Qd by the correction coefficient (1−(α/3)) to calculate the injection amount command value Ql* for the lean combustion cylinder. If the dither control is not executed, the requirement value outputting section M18 only needs to output 0 as the correction requirement value α.

The injection amount controlling section M30 generates an operation signal MS2 for the fuel injection valve 18 of the rich combustion cylinder based on the injection amount command value Qr* and outputs the signal MS2 to the same fuel injection valve 18, thereby operating the fuel injection valve 18 such that the amount of fuel injected from the fuel injection valve 18 becomes the amount corresponding to the injection amount command value Qr*. Also, the injection amount controlling section M30 generates an operation signal MS2 for the fuel injection valve 18 of the lean combustion cylinder based on the injection amount command value Ql* and outputs the signal MS2 to the same fuel injection valve 18, thereby operating the fuel injection valve 18 such that the amount of fuel injected from the fuel injection valve 18 becomes the amount corresponding to the injection amount command value Ql*. Among the cylinders #1 to #4, the rich combustion cylinder is desirably changed at cycle longer than one combustion cycle. Also, when the correction requirement value α is zero, the required injection amount Qd is multiplied by 1 by the dither correcting sections M22 and M28. Thus, when the correction requirement value α is zero, the injection amount command value of each of the cylinders #1 to #4 is the required injection amount Qd. However, for the illustrative purposes, FIG. 2 shows the injection amount command values Ql*, Qr* during the dither control. When the correction requirement value α is zero, the operation signal MS2 is calculated from the required injection amount Qd.

A purge concentration estimating section M32 estimates the concentration (purge concentration Dp) of fuel vapor in the fluid (purge gas) flowing into the intake passage 12 from the canister 36 based on the feedback operation amount KAF. Specifically, the purge concentration estimating section M32 updates the purge concentration Dp to a smaller value when the feedback operation amount KAF increases the base injection amount Qb. The purge concentration estimating section M32 updates the purge concentration Dp to a greater value when the feedback operation amount KAF reduces the base injection amount Qb.

Based on the purge concentration Dp, a target purge ratio setting section M34 sets a target value of the purge ratio (a target purge ratio Rp0*) by dividing the flow rate of the purge gas (purge flow rate) by the intake air amount Ga. The target purge ratio setting section M34 sets the target purge ratio Rp0* to a greater value when the purge concentration Dp is high than when it is low. The purge ratio corresponds to a purge parameter, which is a parameter correlated with the purge flow rate. The target purge ratio Rp0* corresponds to a target purge parameter, which is a target value of the purge parameter. The target purge ratio setting section M34 corresponds to a target purge parameter setting process of setting the target purge parameter.

A guard process section M36 performs an upper limit guard process that limits the target purge ratio Rp0* to a value less than or equal to an upper limit guard value Gdit and outputs the value subjected to the upper limit guard process as the target purge ratio Rp*.

A purge controlling section M38 outputs an operation signal MS5 to the purge valve 38 so as to operate the purge valve 38 so that the purge ratio becomes the target purge ratio Rp*.

Based on the purge concentration Dp and target purge ratio Rp*, a purge correction amount calculating section M40 calculates a reduction correction amount Kpg to reduce the base injection amount Qb in accordance with the flow rate of the fuel vapor flowing into the intake passage 12 from the canister 36 and outputs the reduction correction amount Kpg to the required injection amount calculating section M16. Thus, if the inflow of fuel vapor from the canister 36 to the intake passage 12 is being controlled, the required injection amount calculating section M16 calculates the required injection amount Qd based on the value obtained by reducing the base injection amount Qb by the reduction correction amount Kpg. If the inflow control of fuel vapor from the canister 36 to the intake passage 12 is stopped, the reduction correction amount Kpg only needs to set to 1.

Figure 3:
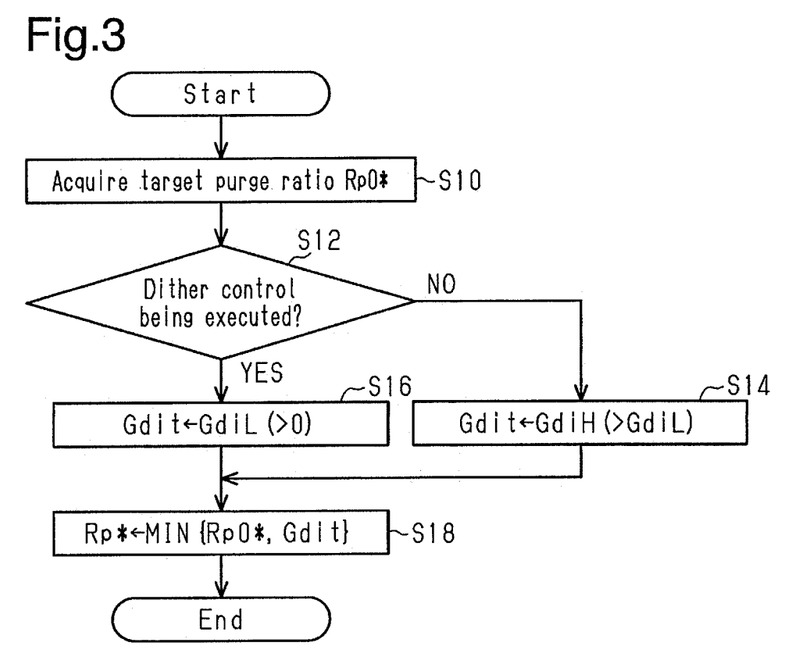
FIG. 3 is a flowchart showing the procedure of a process executed by a guard process section according to the first embodiment.

FIG. 3 shows the procedure performed by the guard process section M36. The process shown in FIG. 3 is performed by the CPU 42 repeatedly executing programs stored in the ROM 44 at a predetermined interval. In the following description, the number of each step is represented by the letter S followed by a numeral.

In the series of processes shown in FIG. 3, the CPU 42 first acquires the target purge ratio Rp0* (S10). Next, the CPU 42 determines whether the dither control is being executed (S12). When determining that the dither control is not being executed (S 2: NO), the CPU 42 substitutes a dither-stop guard value GdiH for the upper limit guard value Gdit of the target purge ratio Rp* (S 14). The dither-stop guard value GdiH is set to a value greater than or equal to the maximum value of the target purge ratio Rp0*, which is set by the target purge ratio setting section M34. In contrast, when determining that the dither control is being executed (S12: YES), the CPU 42 substitutes a dither-execution guard value GdiL for the upper limit guard value Gdit (S16). The dither-execution guard value GdiL is less than the dither-stop guard value GdiH and is set to a value greater than 0 in the present embodiment. The reason why the dither-execution guard value GdiL is set to a value less than the dither-stop guard value GdiH is that there is a risk that the tendency that combustion resulting from the execution of the dither control tends to deteriorate is promoted and made noticeable by the distribution unevenness of fuel vapor among the cylinders due to the purge control. That is, when the dither control is being executed, the air-fuel ratio of the air-fuel mixture in each of cylinders #1 to #4 is made leaner or richer than the target air-fuel ratio, so that the combustion is likely to deteriorate as compared to the case in which the air-fuel ratio is set to the target air-fuel ratio. On the other hand, the purge gas flowing into the intake passage 12 from the canister 36 by the purge control is not evenly distributed to the cylinders #1 to #4, but the distribution may be uneven among the cylinders. Therefore, the required injection amount Qd can deviate from the fuel required for setting the air-fuel ratio of the air-fuel mixture in each of the cylinders #1 to #4 to the target air-fuel ratio. This deviation may promote the tendency that the combustion is likely to deteriorate due to the execution of the dither control as compared with a case in which the dither control is not being executed. For example, if a large amount of fuel vapor flows into the rich combustion cylinder, the air-fuel ratio in the rich combustion cylinder becomes excessively rich, making the combustion unstable. Also, for example, if the fuel vapor flowing into one lean combustion cylinder is less than the others, the air-fuel ratio in that one cylinder becomes excessively lean and the combustion becomes unstable.

When the processes of S14 and S16 are completed, the CPU 42 substitutes the smaller one of the target purge ratio Rp0* and the upper limit guard value GdiT for the target purge ratio Rp* (S18). When the process of step S18 is completed, the CPU 42 temporarily ends the series of processes shown in FIG. 3.

An operation of the present embodiment will now be described.

Figure 4:
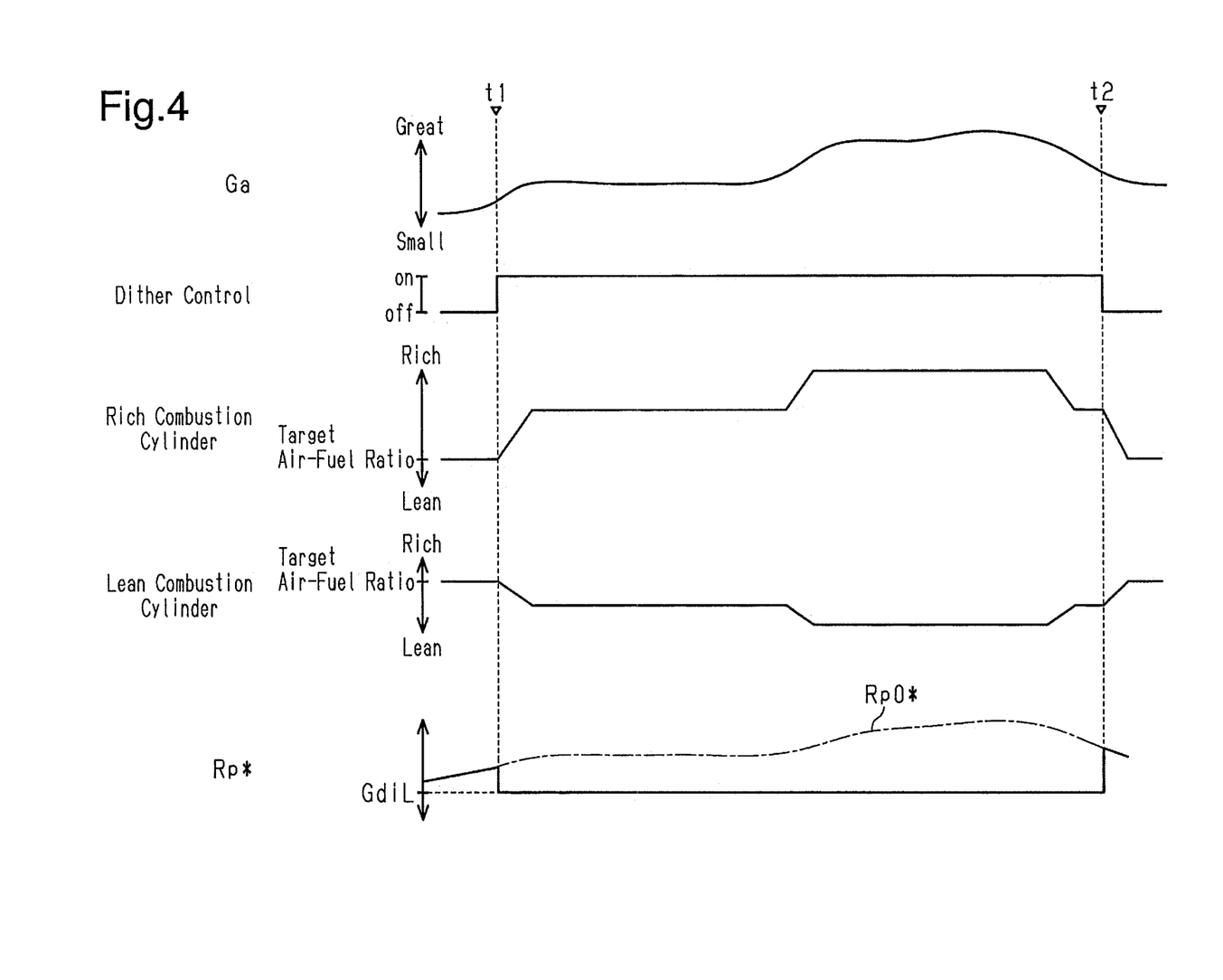
FIG. 4 is a timing chart showing movements of the target purge ratio according to the first embodiment.

FIG. 4 shows examples of the movements of the intake air amount Ga, the execution of the dither control, the air-fuel ratio of the rich combustion cylinder, the air-fuel ratio of the lean combustion cylinder, and the target purge ratio Rp*. FIG. 4 shows a period during which the rich combustion cylinder is not changed among the cylinders #1 to #4. In FIG. 4, for the illustrative purposes, the term "rich combustion cylinder" and "lean combustion cylinder" are also used for the period during which the target air-fuel ratios of the cylinders #1 to #4 are the same. As shown in FIG. 1, when the dither control is started at the point in time t1, the magnitude of the target purge ratio Rp* is limited by the dither-execution guard value GdiL. This causes the target purge ratio Rp* to be less than the target purge ratio Rp0*, which is the value in the case in which the dither control is not executed. For this reason, it is possible to reduce the degree to which the air-fuel ratio in each of the cylinders #1 to #4 deviates from the target air-fuel ratio due to the uneven distribution of the fuel vapor to the cylinders #1 to #4. Accordingly, it is possible to restrain the tendency of deterioration of the combustion due to the execution of the dither control from being promoted or made noticeable by the distribution unevenness of fuel vapor among the cylinders due to the purge control.

The present embodiment described above further has the following advantages.

(1) Setting the upper limit guard value Gdit to a fixed value reduces the number of steps to adjust the upper limit guard value Gdit as compared with a case in which the upper limit guard value Gdit is set variably.

Second Embodiment

A second embodiment will now be described with reference to the drawings. The differences from the first embodiment will mainly be discussed.

Figure 5:
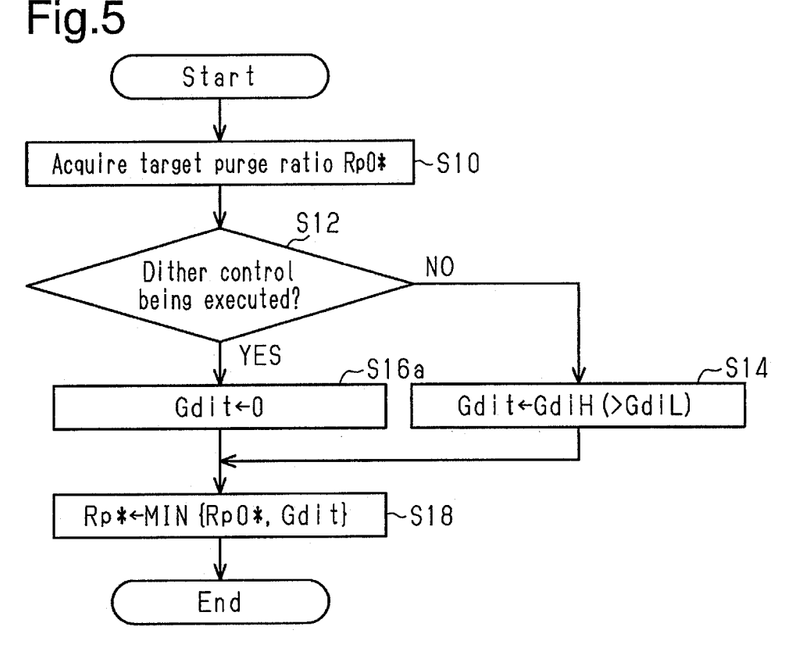
FIG. 5 is a flowchart showing the procedure of a process executed by a guard process section according to the first embodiment.

FIG. 5 shows the procedure performed by the guard process section M36 according to the present embodiment. The process shown in FIG. 5 is performed by the CPU 42 repeatedly executing programs stored in the ROM 44 at a predetermined interval. In FIG. 5, the same step numbers are given to the processes that correspond to those in FIG. 3.

In the series of processes shown in FIG. 5, the CPU 42 sets the upper limit guard value GdiT to zero (S16a) when determining that the dither control is being executed (S12: YES). Thus, during the execution of the dither control, the opening degree of the purge valve 38 is set to zero, which prevents the purge gas from flowing out from the canister 36 to the intake passage 12 via the purge valve 38. In other words, the purge control is prohibited.

Upon completion of the process of S16a, the CPU 42 proceeds to the process of S18.

Third Embodiment

A third embodiment will now be described with reference to the drawings. The differences from the first or second embodiment will mainly be discussed.

In the present embodiment, in addition to the execution of the processes of FIG. 3 or 5, a process of stopping the restriction on the purge control to prohibit the dither control under predetermined conditions is executed.

Figure 6:
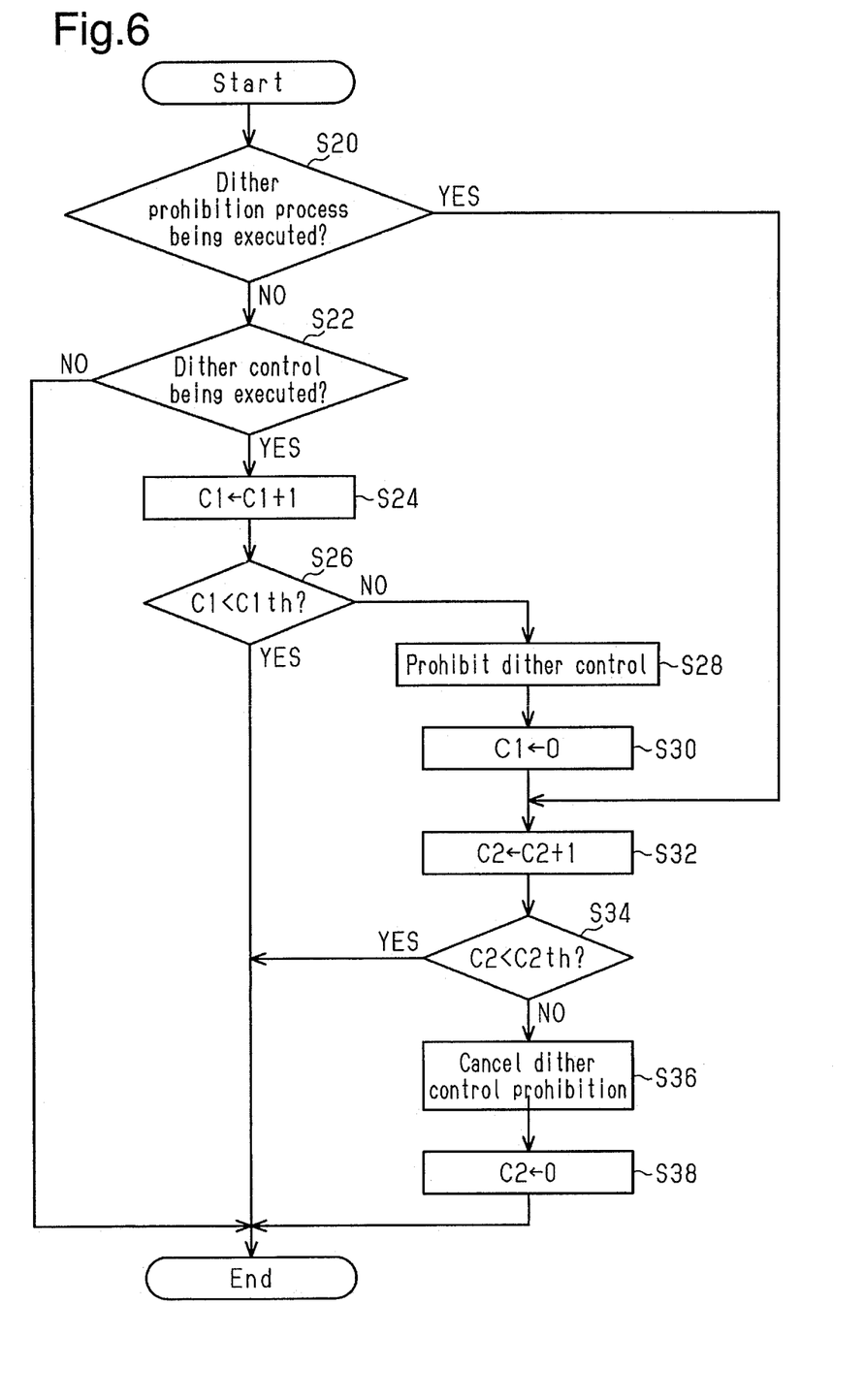
FIG. 6 is a flowchart showing the procedure of a process regarding prohibition of the dither control according to a third embodiment.

FIG. 6 shows the procedure of the processes regarding prohibition of the dither control. The process shown in FIG. 6 is performed by the CPU 42 repeatedly executing programs stored in the ROM 44 at a predetermined interval.

In the series of processes shown in FIG. 6, the CPU 42 first determines whether the prohibition process of the above-described dither control is being executed (S20). When determining that the dither control prohibition process is not being executed (S20: NO), the CPU 42 determines whether the dither control is being executed (S22). When determining that the dither control is being executed (S22: YES), the CPU 42 increments a purge limit counter C1, which measures the time during which the target purge ratio Rp* is limited by the dither-execution guard value GdiL (S24). Next, the CPU 42 determines whether the purge limit counter C1 is smaller than a threshold value C1$th$ (S26). This process is executed to determine whether the concentration of the fuel vapor in the canister 36 may be excessively increased by limiting the purge ratio to a small value due to the execution of the dither control. The threshold value C1$th$ is set to be shorter than the time estimated to be required for the concentration of the fuel vapor in the canister 36 to reach the allowable upper limit value.

When determining that the purge limit counter C1 is greater than or equal to the threshold value C1th (S26: NO), the CPU 42 prohibits the dither control since the concentration of the fuel vapor in the canister 36 may become excessively high, and initializes the purge limit counter C1 (S30). Next, the CPU 42 increments a purge prioritizing counter C2, which measures the time during which the dither control is prohibited in order to prioritize the purge control (S32). Then, the CPU 42 determines whether the purge prioritizing counter C2 is less than a specified value C2th (S34). This process is executed to determine whether the concentration of the fuel vapor in the canister 36 has sufficiently decreased by prohibiting the dither control. The specified value C2th is set to the time required for the concentration of the fuel vapor in the canister 36 to be sufficiently lowered.

When determining that the purge prioritizing counter C2 is greater than or equal to the specified value C2th (S34: NO), the CPU 42 cancels the dither control prohibition (S36) and initializes the purge priority counter C2 (S38).

When S38 is completed, when the determination is negative in S22, or when the determination is positive S26, S34, the CPU 42 temporarily ends the series of processes shown in FIG. 6.

An operation of the present embodiment will now be described.

Figure 7:
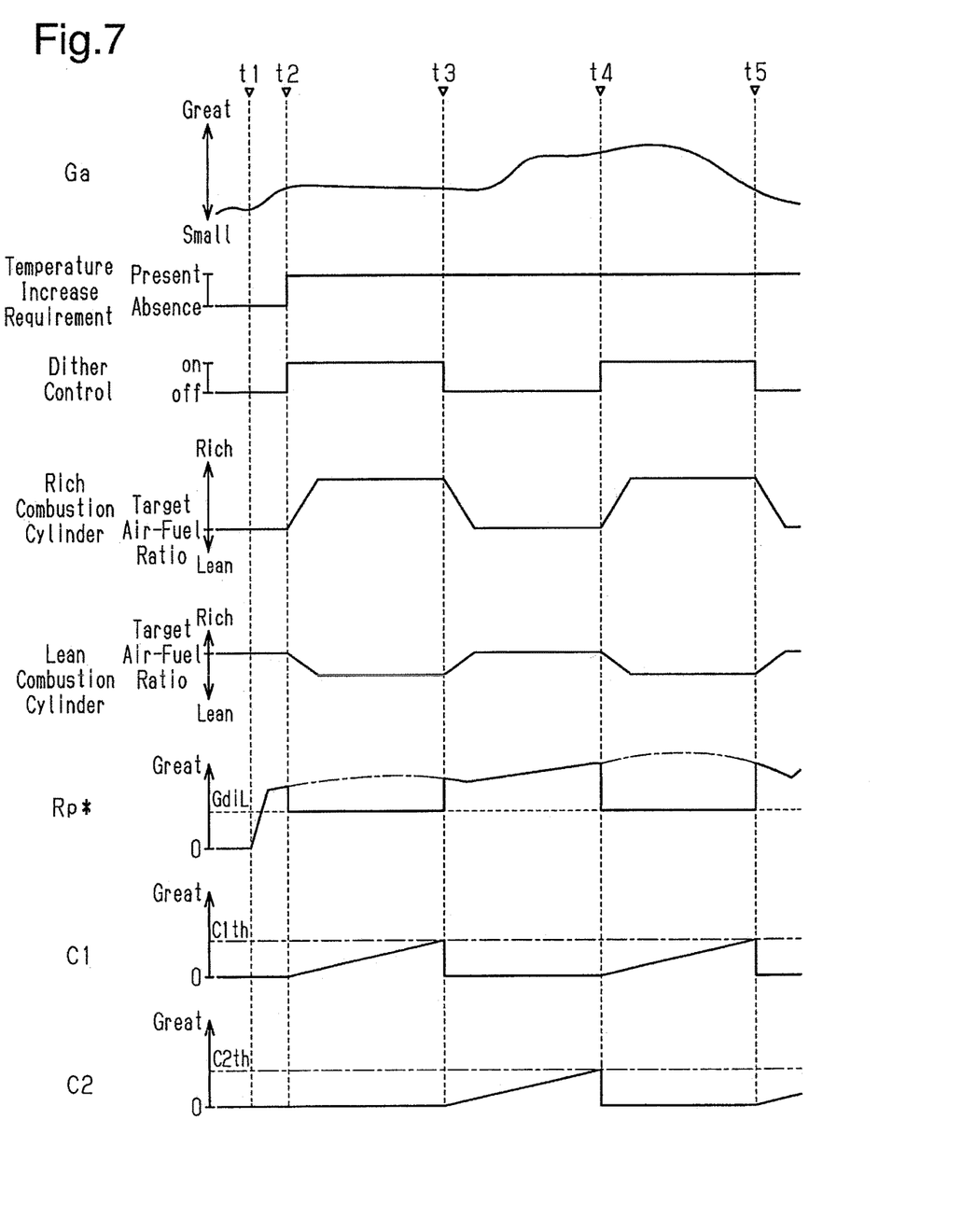
FIG. 7 is a timing diagram showing changes in the state of permission of the execution of the dither control according to the third embodiment.

FIG. 7 shows examples of movements of the intake air amount Ga, the presence or absence of a temperature increase requirement, the execution of the dither control, the air-fuel ratio of the rich combustion cylinder, the air-fuel ratio of the lean combustion cylinder, the target purge ratio Rp*, the purge limit counter C1, and the purge prioritizing counter C2. FIG. 7 shows a period during which the rich combustion cylinder is not changed among the cylinders #1 to #4. For the illustrative purposes, the terms "rich combustion cylinder" and "lean combustion cylinder" are also used for the period during which the target air-fuel ratios of the cylinders #1 to #4 are the same.

When starting the dither control at the point in time t2 after starting the purge control at the point in time t1, the CPU 42 limits the target purge ratio Rp* to the dither-execution guard value GdiL and increments the purge limit counter C1. When the purge limit counter C1 reaches the threshold value C1th at the point in time t3, the CPU 42 prohibits the dither control and initializes the purge limit counter C1. When prohibiting the dither control, the CPU 42 increments the purge prioritizing counter C2. In this case, since restriction of the target purge ratio Rp* with the dither-execution guard value GdiL is canceled, the purge flow rate increases and the concentration of fuel vapor in the canister 36 decreases. Then, when the purge prioritizing counter C2 reaches the specified value C2th at the point in time t4, the CPU 42 cancels the dither control prohibition, starts the dither control, initializes the purge prioritizing counter C2, and restricts the target purge ratio Rp* with the dither-execution guard value GdiL. Then, the CPU 42 increments the purge limit counter C1 and prohibits the dither control again when the purge limit counter C1 reaches the threshold value C1th at the point in time t5.

Thus, in the present embodiment, when the length of time during which the dither control process is executed is longer than or equal to the threshold value, the limiting process, which limits the purge controlling process as the dither control process is executed, is stopped. This restricts the concentration of the fuel vapor in the canister 36 from becoming excessively high. Further, by limiting the dither control process at this time, it is possible to prevent or restrain the tendency of deterioration of the combustion due to the execution of the dither control from being promoted or made noticeable by the distribution unevenness of fuel vapor among the cylinders due to the purge control.

Fourth Embodiment

A fourth embodiment will now be described with reference to the drawings. The differences from the first or third embodiment will mainly be discussed.

Figure 8:
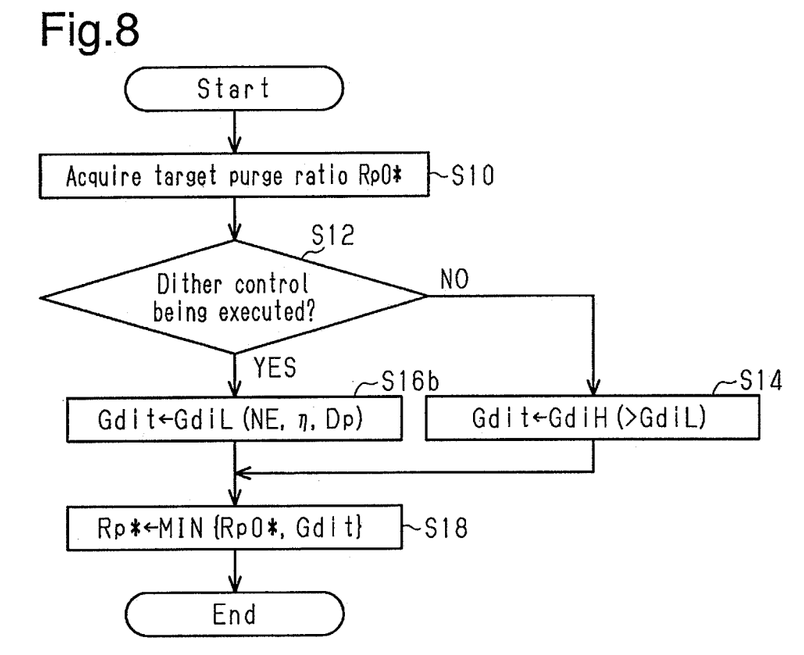
FIG. 8 is a flowchart showing the procedure of a process executed by a guard process section according to a fourth embodiment.

FIG. 8 shows the procedure performed by the guard process section M36 according to the present embodiment. The process shown in FIG. 8 is performed by the CPU 42 repeatedly executing programs stored in the ROM 44 at a predetermined interval. In FIG. 8, the same step numbers are given to the processes that correspond to those in FIG. 3.

In the series of processes shown in FIG. 8, when determining that the dither control is being executed (S12: YES), the CPU 42 variably sets the dither-execution guard value GdiL in accordance with the engine speed NE, the charging efficiency η, and the purge concentration Dp and substitutes the variably set dither-execution guard value GdiL for the upper limit guard value Gdit (S16b). The engine speed NE and the charging efficiency η are parameters that determine the operating point of the internal combustion engine 10. Since the degree of influence of the distribution unevenness of fuel vapor among the cylinders due to the purge control on the combustion of the dither control can vary depending on the operating point of the internal combustion engine 10, the dither-execution guard value GdiL is set variably in the present embodiment. Also, when the purge concentration Dp is high, the CPU 42 sets the dither-execution guard value GdiL to a smaller value than when the purge concentration Dp is low. This setting is employed in consideration of the fact that even if the target purge ratio Rp* is the same, the cylinder-to-cylinder unevenness in the ratio of the fuel vapor that flows out of the canister 36 and into each cylinder to the amount of the air filling the cylinder tends to increase when the purge concentration Dp is high as compared with when the purge concentration Dp is low. More specifically, when the ROM 44 stores map data in which the engine speed NE, the charging efficiency η, and the purge concentration Dp are input variables, and the dither-execution guard value GdiL is an output variable, the CPU 42 only needs to calculate the dither-execution guard value GdiL based on the map data.

Upon completion of the process of S16b, the CPU 42 proceeds to the process of S18.

The present embodiment as described above has the following advantages.

(2) The dither-execution guard value GdiL is variably set in accordance with the operating point of the internal combustion engine 10. This allows the dither-execution guard value GdiL to have an adequate value for each operating point. Thus, the dither-execution guard value GdiL can be made as great as possible as compared with a case in which the dither-execution guard value GdiL is not variably set in accordance with the operating point.

(3) The dither-execution guard value GdiL is variably set in accordance with the dither-execution guard value GdiL. Thus, the dither-execution guard value GdiL can be made as great as possible as compared with a case in which the dither-execution guard value GdiL is not variably set in accordance with the purge concentration Dp.

<Correspondence>

The correspondence between the items in the above embodiments and the items described in the above SUMMARY is as follows. Below, the correspondence is shown for each of the numbers in the examples described in the above SUMMARY.

In Example 1, the catalyst corresponds to the three-way catalyst 24, and the adjustment device corresponds to the purge valve 38. The dither control process corresponds to the processes of the requirement value outputting section M18, the correction coefficient calculating section M20, the dither correcting section M22, the multiplication section M24, the correction coefficient calculating section M26, the dither correcting section M28, and the injection amount controlling section M30. The purge controlling process corresponds to the process of the target purge ratio setting section M34 and the purge controlling section M38, and the limiting process corresponds to the processes of steps S16 (S16a, S16b) and S18.

In example 2, the purge parameter corresponds to the purge ratio, and the guard value corresponds to the upper limit guard value Gdit.

Example 4 corresponds to the process of step S16a.

Example 5 corresponds to the process of step S16b.

In Example 6, the stopping process and the stopping-time limiting process correspond to the process of S28. That is, if the dither control is prohibited by the process of step S28, a negative determination is made by the process of step S12 and the process moves to the process of step S14, so that the limitation of the purge ratio by the execution of the dither control is canceled.

Other Embodiments

At least one feature of the above-illustrated embodiments may be modified as follows.

Regarding Purge Prohibition Process

The prohibition process, which prohibits the purge control on condition that the dither control process is being executed, is not limited to the process that sets the upper limit guard value Gdit to zero as shown in FIG. 5. For example, when the purge valve 38 is of a normally closed type, a process may be employed that stops the output of the operation signal MS5 of the purge valve 38 by the purge controlling section M38. Also, the process itself of the target purge ratio setting section M34 may be stopped.

Regarding Purge Controlling Process

In the above-described embodiment, when controlling the purge flow rate to a value greater than zero, the target purge ratio Rp* is used as a parameter that is directly treated as a controlled amount, and the purge ratio is controlled to the target purge ratio Rp*. However, the configuration is not limited to this. For example, a value obtained by dividing the flow rate of the fuel vapor from the canister 36 to the intake passage 12 by the intake air amount (hereinafter referred to as the vapor ratio) may be used as the controlled amount. By using this controlled amount, the purge flow rate may be controlled by calculating a target vapor ratio and controlling the vapor ratio to the target vapor ratio. The parameter (purge parameter) that is used by the purge controlling process when controlling the purge flow rate and is correlated with the purge flow rate may be the degree of opening of the purge valve 38. Further, the purge parameter is not limited to a parameter having a positive correlation with the purge flow rate, but may be a parameter having a negative correlation with the purge flow rate.

Regarding Guard Process

In the above-described embodiment, the upper limit guard value Gdit of the target purge ratio Rp* is set, but the configuration is not limited to this. For example, as described in the section "Regarding Purge Controlling Process," an upper limit guard value of the target vapor ratio may be set in the case in which the target vapor ratio is calculated as the purge parameter. If this change is applied to the process of FIG. 3, the proportion of the fuel vapor becomes low for the purge ratio when the purge concentration Dp is low. This is advantageous since it is easier to allow the purge rate to be a greater value than when setting the upper limit guard value of the purge rate. If the purge parameter to be guarded by the upper limit guard value has a negative correlation with the purge flow rate, the guard process with the lower guard value is executed.

Regarding Guard Value Varying Process

As exemplified in the process of FIG. 8, when the dither-execution guard value GdiL is variably set in accordance with the operating point of the internal combustion engine 10, the parameters defining the operating point of the internal combustion engine 10 are not limited to the engine speed NE and the charging efficiency which is a parameter (load) having a positive correlation with the cylinder filling air amount. For example, only the load may be used. Alternatively, only the engine speed NE may be used. Further, when variably setting the dither-execution guard value GdiL, the coolant temperature of the internal combustion engine 10 may be taken into consideration. Instead of the operating point, the dither-execution guard value GdiL may be variably set based on a parameter that indicates the difference between the air-fuel ratio in the lean combustion cylinder and the air-fuel ratio in the rich combustion cylinder (for example, the correction requirement value α).

As described in the preceding paragraph, it only requires to delete the purge concentration Dp from the parameters that are used to variably set the upper limit guard value when an upper limit guard value of the vapor ratio is set. However, the upper limit value of the vapor ratio does not necessarily need to be set when an upper limit value is set but is not set variably in accordance with the purge concentration Dp. That is, for example, in the process of FIG. 8, the dither-execution guard value GdiL may be variably set in accordance with the operating point of the internal combustion engine 10 but not in accordance with the purge concentration Dp.

Regarding Stopping Process

In the above-described embodiment, when the length of time during which the dither control process is executed is greater than or equal to the threshold value, the limiting process of limiting the purge control process is stopped with the execution of the dither control process. However, the configuration is not limited to this. For example, in a single period in which the dither process is continuously executed, the limiting process may be stopped when the integrated value of the time when the target purge ratio Rp0* is greater than the upper limit guard value Gdit is greater than or equal to the threshold value.

Regarding Stopping-Time Limiting Process

In the process illustrated in FIG. 6, the dither control is prohibited when the length of time during which the dither control process is executed is greater than or equal to the threshold value, but the configuration is not limited to this. For example, the dither control may be executed while limiting the correction requirement value α to a small value.

Regarding Dither Control Process

In the above-described embodiment, the operating point of the internal combustion engine as a parameter for variably setting the correction requirement value α is determined based on the engine speed NE and charging efficiency η, but the configuration is not limited to this. For example, the operating point may be determined based only on the charging efficiency η or on the intake air amount Ga. It is not essential to variably set the correction requirement value α based on the operating point of the internal combustion engine. For example, the correction requirement value α may be set to a fixed value.

In the above-described embodiment, the number of the lean combustion cylinders is greater than the number of rich combustion cylinders, but the configuration is not limited to this. For example, the number of the rich combustion cylinders and the number of lean combustion cylinders may be equal to each other. Alternatively, instead of setting all the cylinders #1 to #4 to either the lean combustion cylinder or the rich combustion cylinder, the air-fuel ratio of one cylinder may be set to the target air-fuel ratio. Furthermore, it is not essential for the mean value of the exhaust air-fuel ratio to be the target air-fuel ratio within one combustion cycle. For example, in the case of four cylinders as in the above-described embodiment, the mean value of the exhaust air-fuel ratio of five strokes may be set to the target value. Alternatively, the mean value of the exhaust air-fuel ratio of three strokes may be set to the target value. However, it is desirable that a period in which both a rich combustion cylinder and a lean combustion cylinder exist in a single combustion cycle occurs at least once every two combustion cycles. In other words, when setting the target air-fuel ratio to the mean value of the exhaust air-fuel ratio in a predetermined period, it is desirable to set the predetermined period to two or less combustion cycles. For example, if the predetermined period is set to two combustion cycles and the rich combustion cylinder exists only once during two combustion cycles, the appearance order of the rich combustion cylinder and the lean combustion cylinder is represented by R, L, L, L, L, L, L, L, where the lean combustion cylinder is represented by R, and the lean combustion cylinder is represented by L. In this case, a period of one combustion cycle that is shorter than the predetermined period and represented by R, L, L, L is provided, and part of cylinders #1 to #4 is a lean combustion cylinder and the other cylinders are rich combustion cylinders. When the mean value of the exhaust air-fuel ratio in one combustion cycle is not used as the target air-fuel ratio, it is desirable that the amount of air that is drawn into the internal combustion engine in the intake stroke and is blown back to the intake passage before the intake valve closes be negligible.

Regarding Required Injection Amount

In the above-described embodiment, the required injection amount Qd is calculated by reducing the base injection amount Qb by the reduction correction amount Kpg, but the configuration is not limited to this. For example, it is possible to reduce the base injection amount Qb corresponding to the fuel vapor flowing into the intake passage 12 from the canister 36 by the feedback operation amount KAF without reduction correction by the reduction correction amount Kpg.

In addition, it is not essential to correct the influence of fuel vapor with the common correction amount for cylinders #1 to #4. That is, the fuel injection amount may be corrected for each cylinder taking into consideration the unevenness of the inflow fuel vapor to each of cylinders #1 to #4. Even in this case, it is effective to limit the purge control process in the manner of the above-described embodiment on condition that the dither control process is executed when the accuracy of reduction of the influence of unevenness is reduced by the correction.

Regarding Adjustment Device

In the above-described embodiment, the purge valve 38 exemplifies the adjustment device that adjusts the inflow amount of the fuel vapor collected in the canister 36 into the intake passage 12, but the configuration is not limited to this. For example, in an internal combustion engine 10 having a forced-induction device, the pressure in the intake passage 12 may not be lower than the pressure in the canister 36. Taking this into consideration, the adjustment device may be provided with a pump that draws in the fluid in the canister 36 and discharges the fluid to the intake passage 12. In the case of the internal combustion engine 10 equipped with a forced-induction device, the temperature of the catalyst located downstream of the forced-induction device is not easily increased since the heat is drawn from the exhaust gas by the forced-induction device. Thus, it is particularly effective to use the dither control.

Regarding Catalyst Subject to Temperature Increase

The catalyst subject to temperature increase is not limited to the three-way catalyst 24. For example, a gasoline particulate filter (GPF) with a three-way catalyst may be used. If the GPF is provided downstream of the three-way, catalyst 24, the temperature of the GPF may be increased by using the heat of oxidation generated in the three-way catalyst 24 when the unburnt fuel component and the incomplete combustion component of the rich combustion cylinder are oxidized by the oxygen of the lean combustion cylinder. If there is no catalyst with oxygen storage capacity upstream of the GPF, it is desirable to provide the GPF with a catalyst with oxygen storage capacity.

Regarding Temperature Increase Requirement

The temperature increase requirement is not limited to the one in the above-described embodiment. For example, a temperature increase requirement may arise when the three-way catalyst 24 is in an operation region in which sulfur tends to accumulate (for example, the idling operation region). Further, when an internal combustion engine 10 equipped with a GPF is subject to control as in the section "Regarding Catalyst subject to Temperature Increase," a temperature increase requirement may arise due to the dither control in order to burn the particulate matter in the GPF.

Regarding Controller

The controller 40 is not limited to a device that includes the CPU 42 and the ROM 44 and executes software processing. For example, at least part of the processes performed by the software in the above-illustrated embodiments may be performed by hardware circuits dedicated to executing these processes (such as ASIC). That is, the controller may be modified, as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Regarding Internal Combustion Engine

The internal combustion engine is not limited to a four-cylinder engine. For example, an in-line six-cylinder engine may be used. Alternatively, a V engine may be used, which includes a first catalyst and a second catalyst that purifies exhaust gas from different cylinders.

Other

The fuel injection valve is not limited to one that injects fuel into the combustion chamber 16, but may be one that injects fuel, for example, into the intake passage 12. The air-fuel ratio feedback control does not necessarily need to be executed when the dither control is executed. The purge concentration Dp is not limited to the one that is calculated based on the feedback operation amount KAF. For example, the canister 36 may be provided with a fuel concentration sensor, and the detection value of this sensor may be used.

Therefore, the present examples and embodiments are to be considered as illustrative and not restrictive and the disclosure is not to be limited to the examples and embodiments given herein.

The invention claimed is:

1. A controller for an internal combustion engine configured to control an internal combustion engine, the engine including
   a catalyst, which purifies exhaust gas discharged from a plurality of cylinders,
   fuel injection valves provided for the respective cylinders,
   a canister, which collects fuel vapor in a fuel tank, which stores fuel to be injected by the fuel injection valves, and
   an adjustment device, which adjusts a purge flow rate from the canister to an intake passage,
   the controller for an internal combustion engine being configured to execute
   a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio,
   a purge control process of controlling the purge flow rate by operating the adjustment device, and
   a limiting process of limiting the purge control process such that, when the dither control process is being executed, the purge flow rate is reduced as compared to a case in which the dither control process is not being executed.

2. The controller for an internal combustion engine according to claim 1, wherein
   the purge control process includes a target purge parameter setting process of setting a target purge parameter, which is a target value of a purge parameter correlated with the purge flow rate, the purge control process being a process of controlling the purge flow rate by controlling the purge parameter to be the target purge parameter, and
   the limiting process includes a guard process of guarding the target purge parameter with a guard value that limits the purge flow rate such that, when the dither control process is being executed, the purge flow rate is reduced as compared to a case in which the dither control process is not being executed, wherein the limiting process is a process of causing the adjustment device to be operated in the purge control process based on the target purge parameter that is subjected to the guard process.

3. The controller for an internal combustion engine according to claim 2, wherein the guard value is a fixed value.

4. The controller for an internal combustion engine according to claim 2, wherein the guard process includes a guard value varying process of variably setting the guard value based on an operating point of the internal combustion engine.

5. The controller for an internal combustion engine according to claim 1, wherein the limiting process includes a purge prohibition process of prohibiting the purge control process.

6. The controller for an internal combustion engine according to claim 1, wherein the controller executes
   a stopping process of stopping the limiting process of a predetermined period on condition that time during which limitation by the dither control process is performed is longer than or equal to a threshold value, and
   a stopping-time limiting process of limiting the dither control process such that, when the stopping process is executed, a difference in an air-fuel ratio between the cylinders is reduced.

7. The controller for an internal combustion engine according to claim 6, wherein the stopping-time limiting process is a dither prohibition control for prohibiting the dither control.

8. A method of controlling an internal combustion engine, the engine including
   a catalyst, which purifies exhaust gas discharged from a plurality of cylinders,
   fuel injection valves provided for the respective cylinders,
   a canister, which collects fuel vapor in a fuel tank, which stores fuel to be injected by the fuel injection valves, and
   an adjustment device, which adjusts a purge flow rate from the canister to an intake passage,
   the method of controlling an internal combustion engine comprising:
   operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio;
   controlling the purge flow rate by operating the adjustment device; and
   limiting the purge control process such that, when the dither control process is being executed, the purge flow rate is reduced as compared to a case in which the dither control process is not being executed.

* * * * *